United States Patent [19]

Serrie et al.

[11] Patent Number: 4,544,980
[45] Date of Patent: Oct. 1, 1985

[54] DOMESTIC POWER LINE BREAKER

[75] Inventors: Gerard J. J. Serrie, Reims; Jean-Marie Huvet, Rilly la Montagne, both of France

[73] Assignee: Claude, S.A., Puteaux, France

[21] Appl. No.: 458,111

[22] Filed: Jan. 14, 1983

[30] Foreign Application Priority Data

Jan. 18, 1982 [FR] France .................. 82 00654

[51] Int. Cl.$^4$ .............................................. H02H 3/33
[52] U.S. Cl. ........................................ 361/45; 361/94; 361/96
[58] Field of Search ............. 361/45, 46, 44, 96, 361/94

[56] References Cited

U.S. PATENT DOCUMENTS

| | | | |
|---|---|---|---|
| 3,377,540 | 4/1968 | Meyer | 361/94 X |
| 3,733,517 | 5/1973 | Wilson | 361/44 |
| 3,962,606 | 6/1976 | Burns et al. | 361/45 |
| 4,024,435 | 5/1977 | Gross | 361/45 |
| 4,047,235 | 9/1977 | Davis | 361/94 X |

*Primary Examiner*—Patrick R. Salce

*Attorney, Agent, or Firm*—Edward J. Coleman; José W. Jimenez

[57] ABSTRACT

An automatic domestic power line breaker comprising a current-to-voltage converter to which is applied an input signal obtained from the secondary of a differential transformer coupled to the power line. The converter output is coupled through a low pass filter to a rectifier, the output of which is connected to a function generator, which provides an output signal comprising a voltage having a slope proportional to the peak amplitude of the rectifier output signal. The function generator output is applied to a first input of a comparator having a second input to which is applied a d.c. threshold voltage. The comparator output signal is applied through an amplifier to control the state of a set of normally open relay contacts series connected in the power line conductors. A feed-back diode shunts the first input and output of the comparator to lock the relay contacts in the open state if the breaker has controlled opening of the contacts. The circuits of the breaker are energized through a restrike switch which must be activated in order to unlock the relay contacts and allow the contacts to be closed when the cause of the input signal which had resulted in opening of the contacts disappears.

3 Claims, 2 Drawing Figures

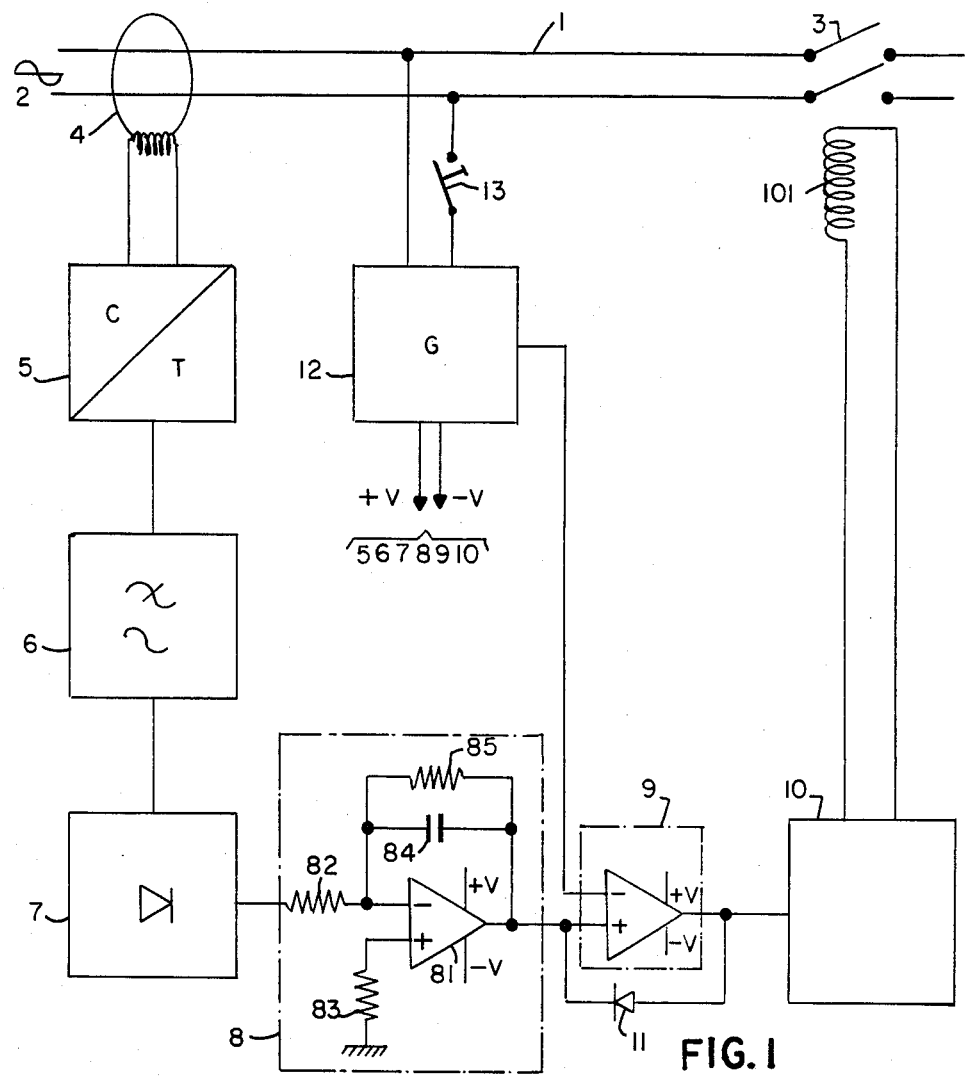
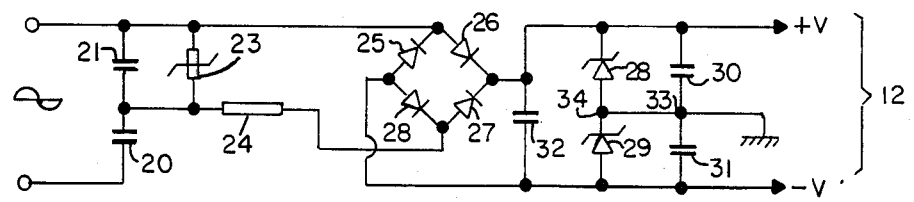
FIG. 1
FIG. 2

DOMESTIC POWER LINE BREAKER

This invention relates to automatic domestic power line breakers which are designed in order to switch off the relay contacts in series in a power line without delay if the detected differential current is high and with a predetermined delay if it is low in order to avoid inopportune opening of the contacts and a good human protection.

It is known that a flow of an alternating current (50 or 60 Hz) through a human body may have many consequences from pricklings to heart ventricle fibrillations according to the intensity of the current, the time lapse of the flow, and the path of the current flow through the body.

For instance, there is no cardiac danger for a man in good health to be traversed by a 30 mA current during 10 seconds or by a 500 mA current during less than 20 ms. But a physiological tetanus defines another current threshold above which it is not possible to release a hold; this last threshold has an average value of about 10 mA, but it depends upon the physiological characteristics of each person and, more particularly, upon the sex and upon the age. For instance, this last threshold may decrease to 6 mA for women and less for babies, as disclosed by Dr. J. Cabanes in a paper in French language published by the Revue Générale d'Electricité and entitled "Nature des Effets Physiologiques du Courant Electrique" (RGE-FRA, ISSN 0035-3116, 10/81 No. 10, pp 707–711).

An automatic power line breaker is used, in domestic homes, located on the power distribution board in order to disconnect the supply line when a 500 mA defect current is detected, but it requires a ground connection having a very low resistor. If the ground resistor is not very low, a line breaker switching off the power line for a 1 mA defect current is connected. But in this case, noise and transient currents being similar to defect currents, it is necessary that the line breaker distinguishes them in order to avoid inopportune opening of the relay contacts.

Every domestic power line breaker includes a differential transformer connected between the load and the a.c. supply on the power line and a relay which contacts are in series in the line also between the load and the a.c. supply. When a defect current occurs in the line, a signal is generated in the secondary winding of the differential transformer. This signal is used to control the state of the relay after processing. In order to have a response curve depending upon the duration of the defect current and upon its intensity, it is known to apply this signal to a series connection of n amplifiers, the output of each one being connected to a delay circuit generating a pulse; all the pulses are then applied to a comparator in order to control the state of the relay if one of these pulses is higher than a predetermined threshold. The response curve of such a breaker is of a staircase type and is not similar to the known danger curve. Moreover, this breaker needs n amplifiers and n delay circuits; so, its reliability decreases when the integer n increases. It is then necessary to choose n small enough to obtain a reasonable reliability and a competitive cost, and high enough to sufficiently approximate the danger curve.

In the U.S. Pat. No. 3,836,821 another kind of a ground fault protective system is disclosed; it utilizes an operational amplifier, integrator and switching means for interrupting the flow of current in the power line when the amplified and integrated signal produced by the fault current reaches a defined threshold value. However, for operating, the neutral conductor of the power line must be connected to ground and clearly identified all along the line. Moreover, the switching means contacts are normally closed and a coil must be energized to interrupt the flow of current, which is not safe if one component of the circuit fails. Finally, this system includes a pulser and a second transformer which further reduces the reliability of the system.

The object of the present invention is to obviate these disadvantages. It is another object of the invention to enhance domestic power line breakers operating in a positive safety mode. These and other objects are accomplished in accordance with one aspect of the invention by the provision of a domestic power line breaker including a relay which contacts, in series with the both conductors of the power line between the load and the a.c. power supply, are open when its controlling coil is not energized, the input signal of the breaker being delivered by the secondary winding of a differential transformer, the primary winding of which is in series connection with the power line between said contacts and the a.c. supply.

The power line breaker comprises a current-to-voltage converter to which is applied the input signal, the output of which is connected to a low-pass filter in series connection with a rectifier, which output is connected to a function generator, the output signal of which presents a slope of voltage proportional to the peak-amplitude of the signal delivered by the rectifier and is applied to the first input of a comparator having a second input to which is applied a d.c. threshold voltage. The output signal of the comparator is applied to the input of an amplifier the output of which controls the state of the relay contacts.

A feed-back diode shunts the first input and the output of the comparator, in order to lock the relay contacts in open state if the breaker has controlled their opening. The circuits of the breaker are energized through a restrike switch which must be used in order to unlock the relay contacts and to allow their closing when the cause which resulted in their opening disappears.

Other objects, advantages and characteristics of the invention will appear more clearly as the invention becomes better understood in accordance with the following detailed description of an embodiment in conjunction with the accompanying drawings in which:

FIG. 1 is a schematic diagram of a breaker designed in accordance with the present invention; and FIG. 2 is a schematic diagram of the associated d.c. supply.

Referring now to the drawings with greater particularity, there is shown in FIG. 1 a domestic power line breaker designed in accordance with the present invention.

The power line 1 connects the a.c. power supply 2, for instance 220 volts 50 Hertz or 115 volts 60 Hertz, to a load which is not represented on the figure. The neutral conductor of the line does not have to be defined for disclosing the operation of the breaker.

A relay 3 is connected in series in the line 1 between the a.c. supply and the load. The contacts of this relay 3 are normally open when the controlling coil 101 is not energized. This relay includes a set of contacts for each conductor of the line 1 in order to simultaneously switch both conductors and, thus, achieve complete safety for the user. The primary windings of a differential transformer 4 are connected in the upstream part of the power line 1 in order to deliver at its secondary windings a signal when a differential current appears in the power line 1.

The intensity of the signal depends directly upon the intensity of the detected differential current, and the frequency of this signal is the same as that of the a.c. supply (i.e., 50 or 60 Hertz). This signal is applied first to a current-to-voltage converter 5 having a zero input impedance and a predetermined gain such as an operational amplifier. This voltage signal is then applied to a low-pass filter 6 having a cut-off frequency which is slightly higher than the frequency of the a.c. supply in order to eliminate transient and noise currents which are not defect currents. This filter 6, which may also be a differential amplifier, is connected to a rectifier 7 in order to deliver a d.c. voltage signal in response to the differential current detected in the power line 1.

This d.c. voltage signal is then applied to a function generator 8 the output signal of which presents a slope of voltage proportional to the peak amplitude of the input d.c. voltage signal. This function generator 8 may be, for instance and preferably, a logarithmic integrator.

The output signal of this function generator 8 is then applied to the first input of a comparator 9, to the second input of which is applied a predetermined d.c. threshold voltage. Such a comparator is preferably also an operational amplifier.

The output of the comparator 9 is connected to an amplifier 10 controlling the state of the relay contacts 3, via the coil 101. For closing the relay contacts 3, the coil 101 must be energized in order to achieve the positive safety operation of the breaker.

A feed-back diode 11 shunting the first input and the output of the comparator 9 allows the relay contacts 3 to be locked in an open state when they have been opened by the breaker.

More in detail, the function generator 8 includes an operational amplifier 81 having two inputs and one output. The negative input is connected, through a resistor 82 to the output of the rectifier 7, while its positive input is connected to a common conductor through a resistor 83. A branch including a capacitor 84 and a resistor 85 in parallel is connected between the output of the amplifier 81 and the negative input thereof. The slope of the output voltage of this function generator 8 depends essentially upon the value of the resistor 85. In this embodiment, the lapse of time between a detection of the differential current and the instant when the ouptut voltage of the generator 8 reaches the threshold voltage applied to the comparator 9 is a logarithmic function of the intensity of the detected defect current.

A source 12 generates the required voltages to the operation of each part of the breaker and the d.c. threshold voltage applied to the comparator 9. This source 12 is connected to the power line 1 via a restrike switch 13. Referring to FIG. 2, this source 12 includes a voltage divider comprising two capacitors 20, 21 shunting its inputs. A varistor 23 shunts the capacitor 21 and prevents small disturbances, such as overvoltages.

The divided a.c. voltage at the junction point of the two capacitors 20, 21 is applied through a series connected resistor 24 to a rectifier, for instance to a full-wave bridge rectifier consisting of diodes 25-28, the output d.c. voltage of which is controlled by a pair of series connected Zener diodes 28-29 and stabilized by the capacitors 30-31 shunting respectively the Zener diodes 28-29, and by the capacitor 32 shunting the output of the rectifier. The junction point 33 of both capacitors 30, 31 is connected to the junction point 34 of the two Zener diodes 28-29 and constitutes the common conductor to which is connected one end of the resistor 83 of the function generator 8.

The voltage of the common conductor is the reference voltage for the circuits of the breaker, and the source 12 delivers two symmetrical voltages with respect to this reference voltage in order to supply the operating voltages of the operational amplifiers of the breaker and the control of the threshold voltage applied to the comparator 9. This makes clear why it is not necessary to identify the conductors of the power line 1 in order to determine the neutral one.

Operation of the breaker is now described. When there is no differential current in the power line 1, the restrike switch 13 being closed, the breaker is in a surveillance state. The coil 101 is energized and the relay contacts 3 are closed, the load is normally supplied. Note that if the switch 13 is open, the relay contacts 3 are automatically open since the coil 101 is not energized, in order to insure the complete safety for the user.

When a differential current appears on the power line 1, for instance due to a leakage current between one of the conductors of the power line and the ground, a signal is generated at the secondary windings of the transformer 4 and is applied to the other circuits. The function generator 8 generates a voltage signal having a slope which is proportional to the detected differential current intensity. When the voltage of this signal reaches the d.c. threshold voltage applied to the comparator 9, the amplifier de-energizes the coil 101 which results in the opening of the relay contacts 3. The prominent part of this function generator 8 is to accelerate the opening of the relay contacts 3 if the detected differential current is high and to provide a delay for the opening if it is low and without danger, in order to avoid inopportune openings of these contacts. As a result of the operation of function generator 8, the response curve of the breaker may correspond to the known danger curve.

By adjusting the value of the resistors 82 and 85, each point of this response curve remains below the threshold above which a person cannot release a hold.

The feed-back diode 11 applies to the first input of the comparator 9 the output voltage thereof, and thereby locks the breaker in a safety state by preventing the closing of the relay contacts 3 unless the user takes an action to override this provision.

To again close the relay contacts 3, it is then necessary to open the restrike switch 13 and to close it again in order to restrike the breaker in order to put it in the surveillance state.

Hence, it can be seen that the safety of this breaker is positive especially since all the surveillance circuits operate independently of the state of the relay contacts 3, which cannot be closed if the breaker is not in surveillance state.

While only the preferred embodiment of the invention has been described, it should be evident that all modifications made by one of ordinary skill in the art in the same spirit would not depart from the scope of the present invention.

We claim:

1. A domestic power line breaker including a relay with contacts, in series with both conductors of the power line between the load and the a.c. power supply, said contacts being open when the control coil of said relay is not energized, the input signal of said breaker being delivered by the secondary windings of a differential transformer detecting any differential current in said line and being located on said power line between said contacts and said a.c. supply, said breaker being characterized in that it includes a current-to-voltage converter (5), a low pass filter (6), a rectifier (7), a function generator (8), a comparator (9) and an amplifier (10), said input signal being applied to said current-to-voltage converter (5), the output of which is connected to said low-pass filter (6) in series connection with said rectifier (7) the output of which is connected to said function generator (8) generating a voltage signal which is applied to the first input of said comparator (9) having a second input to which is applied a predetermined d.c. threshold voltage, the output signal of said comparator (9) being applied to the input of said amplifier (10) controlling the state of said relay contacts (3), the circuits of said breaker being supplied by a d.c. voltage source (12) connected to said power line (1) between said relay (3) and said a.c. power supply (2) through a restrike switch (13), said breaker further including a diode (11) that shunts said first input and said output of said comparator (9), in order to lock the relay contacts (3) in an open state if said breaker has controlled their opening.

2. A domestic power line breaker including a relay with contacts, in series with both conductors of the power line between the load and the a.c. power supply, said contacts being open when the control coil of said relay is not energized, the input signal of said breaker being delivered by the secondary windings of a differential transformer detecting any differential current in said line and being located on said power line between said contacts and said a.c. supply, said breaker being characterized in that it includes a current-to-voltage converter (5), a low-pass filter (6), a rectifier (7), a function generator (8), a comparator (9) and an amplifier (10), said input signal being applied to said current-to-voltage converter (5), the output of which is connected to said low-pass filter (6) in series connection with said rectifier (7) the output of which is connected to said function generator (8) generating a voltage signal which is applied to the first input of said comparator (9) having a second input to which is applied a predetermined d.c. threshold voltage, the output signal of said comparator (9) being applied to the input of said amplifier (10) controlling the state of said relay contacts (3), the circuits of said breaker being supplied by a d.c. voltage source (12) connected to said power line (1) between said relay (3) and said a.c. power supply (2) through a restrike switch (13), said breaker further including a diode (11) that shunts said first input and said output of said comparator (9), in order to lock the relay contacts (3) in an open state if said breaker has controlled their opening and said function generator (8) being a logarithmic integrator, the output signal of which presents a slope of voltage proportional to the peak amplitude of the d.c. voltage applied at its input.

3. A domestic power line breaker including a relay with contacts, in series with both conductors of the power line between the load and the a.c. power supply, said contacts being open when the control coil of said relay is not energized, the input signal of said breaker being delivered by the secondary windings of a differential transformer detecting any differential current in said line and being located on said power line between said contacts and said a.c. supply, said breaker being characterized in that it includes a current-to-voltage converter (5), a low-pass filter (6), a rectifier (7), a function generator (8), a comparator (9) and an amplifier (10), said input signal being applied to said current-to-voltage converter (5), the output of which is connected to said low-pass filter (6) in series connection with said rectifier (7) the output of which is connected to said function generator (8) generating a voltage signal which is applied to the first input of said comparator (9) having a second input to which is applied a predetermined d.c. threshold voltage, the output signal of said comparator (9) being applied to the input of said amplifier (10) controlling the state of said relay contacts (3), the circuits of said breaker being supplied by a d.c. voltage source (12) connected to said power line (1) between said relay (3) and said a.c. power supply (2) through a restrike switch (13), said breaker further including a diode (11) that shunts said first input and said output of said comparator (9) in order to lock the relay contacts (3) in an open state if said breaker has controlled their opening, said function generator (8) being a logarithmic integrator, the output signal of which presents a slope of voltage proportional to the peak amplitude of the d.c. voltage applied at its input and said function generator (8) including a differential amplifier (81) having two inputs and one output, the first input being connected through a first resistor (82) to the output of said rectifier (7) and the second input being connected to the common conductor of said d.c. source (12) through a second resistor (83), a branch including a capacitor (84) and a third resistor (85) in parallel being connected between said output and said first input of said differential amplifier (81).

* * * * *